US006944665B2

(12) United States Patent
Brown et al.

(10) Patent No.: US 6,944,665 B2
(45) Date of Patent: Sep. 13, 2005

(54) METHOD AND SYSTEM FOR DELIVERING ACCESSIBILITY USING A DISTRIBUTED ENVIRONMENT

(75) Inventors: Frances C. Brown, Austin, TX (US); Susan Crayne, Hartsdale, NY (US); Samuel R. Detweiler, Austin, TX (US); Peter Gustav Fairweather, Yorktown Heights, NY (US); Vicki Lynne Hanson, Chappaqua, NY (US); Richard Scott Schwerdtfeger, Round Rock, TX (US); Beth Rush Tibbitts, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 776 days.

(21) Appl. No.: 09/961,897

(22) Filed: Sep. 24, 2001

(65) Prior Publication Data

US 2003/0061299 A1 Mar. 27, 2003

(51) Int. Cl.[7] .................................................. G06F 13/00
(52) U.S. Cl. ...................... 709/227; 709/203; 709/217; 709/219; 709/236
(58) Field of Search ................................. 709/200–201, 709/203, 217–227, 236, 246

(56) References Cited

U.S. PATENT DOCUMENTS

| | | | |
|---|---|---|---|
| 5,727,159 A | * | 3/1998 | Kikinis ........................ 709/246 |
| 5,940,598 A | | 8/1999 | Strauss et al. |
| 6,009,103 A | | 12/1999 | Woundy |

(Continued)

FOREIGN PATENT DOCUMENTS

GB    2 346 238 A    2/2000

OTHER PUBLICATIONS

"A Process for the Blending of Web Content", International Business Machines Research Disclosure, pp. 778–779, Apr. 2000.

"A Process for Optimized Applications of XSL Stylesheets for Use with Partially Static XML Data Streams", International Business Machines Research Disclosure, pp. 784–785, Apr. 2000.

*Primary Examiner*—Ario Etienne
*Assistant Examiner*—Hussein El-chanti
(74) *Attorney, Agent, or Firm*—Robert M. Carwell; Dillon & Yudell LLP

(57) ABSTRACT

A method and system that provide an accessibility gateway to the Internet through the use of a web intermediary server, which may belong to a different domain than the web content server. The web intermediary server includes server-generated applications for modifying accessibility settings for supported client devices, registering the user for authority to use the intermediary server services, and generating web-based, user-specific browser service replacements such as history lists and bookmarks. A request for any web page is sent from the client device to the intermediary server. The intermediary server retrieves the requested web document, and applies user-defined transformations to the web document, which is then sent back to the user device's user agent. If the web document is from a secure web page, the intermediary server functions as a proxy for the user device to establish the requisite secure connection with the web page.

24 Claims, 3 Drawing Sheets

U.S. PATENT DOCUMENTS

| | | | |
|---|---|---|---|
| 6,038,595 A | 3/2000 | Ortony | |
| 6,055,275 A | 4/2000 | Pinier et al. | |
| 6,073,168 A | 6/2000 | Mighdoll et al. | |
| 6,101,328 A * | 8/2000 | Bakshi et al. | 717/170 |
| 6,185,625 B1 * | 2/2001 | Tso et al. | 709/247 |
| 6,199,144 B1 | 3/2001 | White et al. | |
| 6,247,048 B1 * | 6/2001 | Greer et al. | 709/219 |
| 6,304,904 B1 * | 10/2001 | Sathyanarayan et al. | 709/224 |
| 6,311,215 B1 * | 10/2001 | Bakshi et al. | 709/221 |
| 6,345,300 B1 * | 2/2002 | Bakshi et al. | 709/229 |
| 6,345,303 B1 * | 2/2002 | Knauerhase et al. | 709/238 |
| 6,421,733 B1 * | 7/2002 | Tso et al. | 709/246 |
| 6,611,358 B1 * | 8/2003 | Narayanaswamy | 358/442 |
| 6,662,218 B2 * | 12/2003 | Mighdoll et al. | 709/219 |
| 6,704,024 B2 * | 3/2004 | Robotham et al. | 345/581 |
| 6,772,200 B1 * | 8/2004 | Bakshi et al. | 709/217 |

* cited by examiner

METHOD AND SYSTEM FOR DELIVERING ACCESSIBILITY USING A DISTRIBUTED ENVIRONMENT

CROSS-REFERENCE TO RELATED APPLICATIONS

The present application is related to the following co-pending applications, which filed on even date herewith and incorporated herein by reference: U.S. patent application Ser. No. 09/962,000 U.S. patent application Ser. No. 09/961,896.

BACKGROUND OF THE INVENTION

1. Technical Field

The present invention relates in general to the field of computer networks, and, in particular, to the connection between a user device and a content server. Still more particularly, the present invention relates to an improved method and system for providing accessibility to a disabled client for any Internet Web site.

2. Description of the Related Art

The Internet comprises a vast network of heterogenous computers and sub-networks all communicating together to allow for global exchange of information. The World Wide Web (WWW) is one of the more popular information services on the Internet. The WWW uses browser software to decipher HyperText links to other documents or files located on remote computers, all of which are connected to the Internet. Browsers provide a user-friendly interface that allows users to easily navigate from site to site or file to file around the Internet. Using a browser, a user can access information in the form of text, audio, video, still pictures and related multimedia stored on remote computers or content servers.

FIG. 1 is a block diagram of the Internet and other devices that may be used to access the Internet. A client device 10, such as a desktop computer, laptop computer, personal digital assistant (PDA), onboard vehicle computer, cellular telephone, etc., sends a request for a Web site, typically under the HyperText Transfer Protocol (HTTP) to an Internet Service Provider (ISP) 12. ISP 12 establishes a link to Internet 14, which then passes the HTTP request to a content server 16. This request is forwarded to a content provider 18 that is typically a web page addressed by a Uniform Resource Indicator (URI) such as a Uniform Resource Locator (URL).

The response from client device 16 is typically in the language of HyperText Markup Language (HTML) that is the standard language for creating documents on the World Wide Web (WWW). HTML defines the structure and layout of a web document by using a variety of tag commands inserted in the document to specify how the document, or portion of the document, should be formatted. The response from content provider 18, is routed back through content server 16, Internet 14, and ISP 12 to client device 10.

A major problem for the Internet relates to providing access to web pages to handicapped users, including the visually impaired, hearing impaired and physically handicapped. Such accessibility primarily consists of changing the style of information received from a web page, such as changing print font sizes or converting written text to aural speech for the visually impaired. Accessibility features also relate to modifying how information is input into the user's device (such as a computer), to include changing the time delay for auto-repeat functions on a keyboard for users unable to quickly strike keys, changing mouse roller ball sensitivity and other changes to input devices to accommodate physical limitations of the user. Internet accessibility programs have historically been limited to a particular application program or operating system for the client device being used by the handicapped user. Additionally, some web pages have inherent accessibility functions that can be used only for that page.

Another problem found in accessibility prior art relates to the process of transcoding content from content provider 18 to a format that is recognizable by the hardware/software of a particular client device 10. Typically, a response from a web page is conventionally formatted via standard page description language such as HTML, which contains text and can reference graphics, sound, animation and video data. If client device 10 is a pervasive device, such as a PDA, smart phone, wearable computer, etc., it typically must communicate in a non-HTML language, and usually through a dedicated ISP 12. The dedicated ISP 12 directs the request from the pervasive device to a special URL, typically sub-defined by content server 16 or content provider 18, to reply with the appropriate response in the appropriate language, such as Wireless Application Protocol (WAP) for handheld wireless devices such as mobile phones, pagers, two-way radios, smart phones and communicators. Alternatively, ISP 12 may have the ability to transcode an HTML response from a content provider 18, but this ability has historically been limited to a limited predefined number of content providers. Thus accessibility requires not only transcoding of content by changing font size, background color, etc. for a particular handicapped user, the transcoded content needs to be understandable by the particular type of client device 10 being used.

The problem of transcoding for accessibility is complicated if the user of client device 10 sends a request to a secure server. Secure connections in the prior art between a secure content server 16 and client device 10 establish the requirement that the connection be inaccessible to any third party. For example, a user making a purchase over the Internet would want information regarding credit card numbers and other financial details to be inaccessible to outside hackers. A secure content server 16 supports any of the major security protocols that encrypt and decrypt messages to protect them against third-party tampering. A typical protocol for a secure connection is the Secure Sockets Layer (SSL) protocol, which uses a public key, typically a code table, to decipher any coded data. By convention, web pages that require an SSL connection start with the URL address of "https:" instead of "http:". It is understood that the socket of an SSL is typically a software object, not a physical component of a computer system. Thus, accessibility transcoding of content from secure web pages can only be accomplished if the transcoder can communicate between client device 10 and secure content server 16.

It should therefore be apparent that there exists a need for a universal accessibility system for a handicapped user to access any selected web page, secure or non-secure. Such a system should include a user-specific and user-defined transcoding system that includes transcoding operations to provide accessibility to that client user, such as font modification, background displays, etc., that can be delivered to a variety of client devices 10 used by that user. It would further be desirable to devise a computer program product wherein such a method may be performed on a computer system. In addition, it would be desirable to devise a proxy machine having the ability to transcode responses from a content provider 18 to a client device 10 according to user-defined preferences for accessibility.

SUMMARY OF THE INVENTION

The present invention in its preferred embodiment is a method and system that provide an accessibility gateway to the Internet through the use of a web intermediary server, which in the preferred embodiment belongs to a different domain than the web content server. The web intermediary server preferably includes server-generated applications for modifying accessibility settings for supported client devices, registering the user for authority to use the intermediary server services, and generating web-based, user-specific browser service replacements such as history lists and bookmarks. A request for any web page is sent from the client device to the intermediary server. The intermediary server retrieves the requested web document, and applies user-defined transformations to the web document, which is then sent back to the user device's user agent. If the web document is from a secure web page, the intermediary server functions as a proxy for the user device to establish the requisite secure connection with the web page. The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 2:
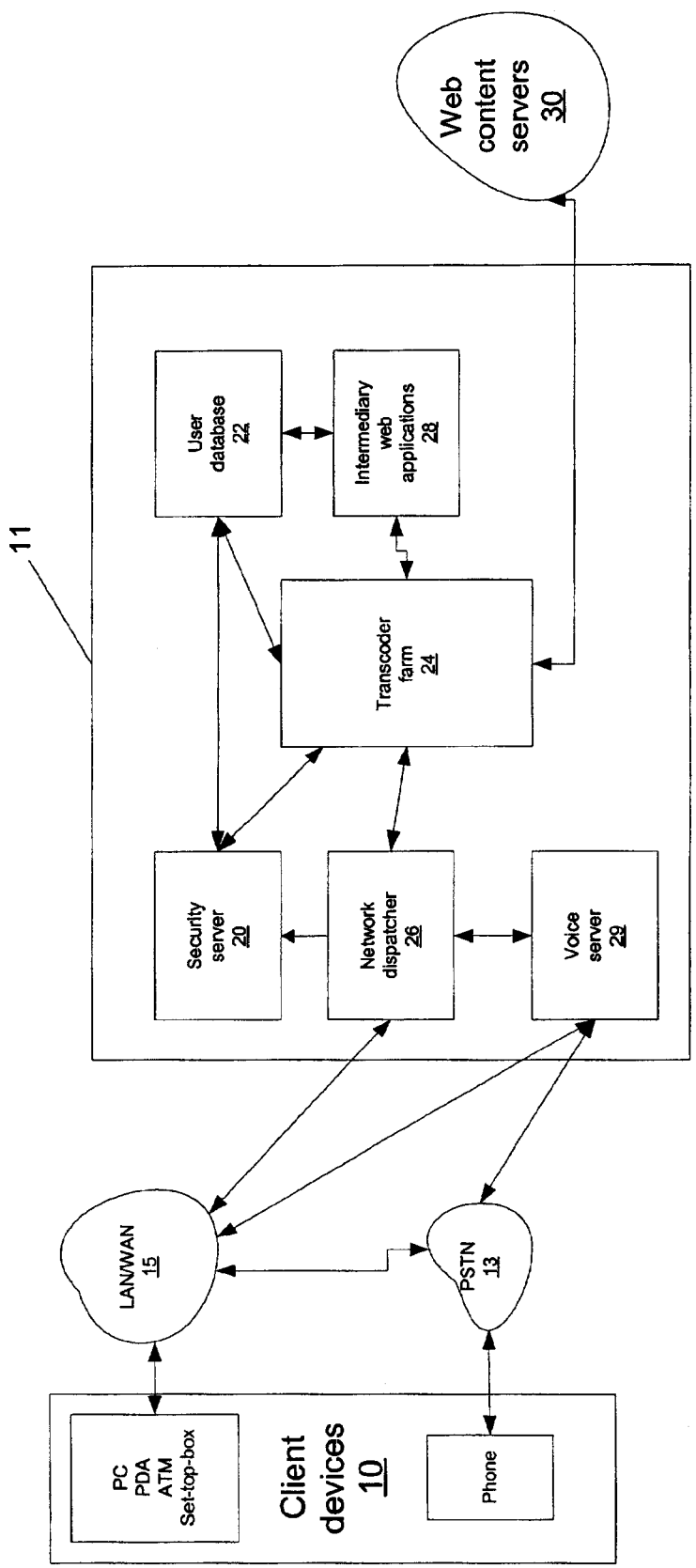
FIG. 2 illustrates a simplified block diagram of an Internet connection using an intermediary server for transcoding content.

With reference now to FIG. 2 there is depicted a block diagram of the preferred Internet connection between client device 10 and web content server 30. Client device 10 may be a network connected device connected through a Local Area Network (LAN) or Wide Area Network (WAN), which LAN/WAN 15 connects directly to proxy machine 11. Such devices may be a desktop computer, laptop computer, set top box, PDA, Automated Teller Machine (ATM), or computer kiosk. In addition, client device 10 may be a cellular telephone, which typically is connected through a Public Switched Telephone Network PSTN 13 that connects the cellular telephone to proxy machine 11, either directly or via LAN/WAN 15.

Figure 1:
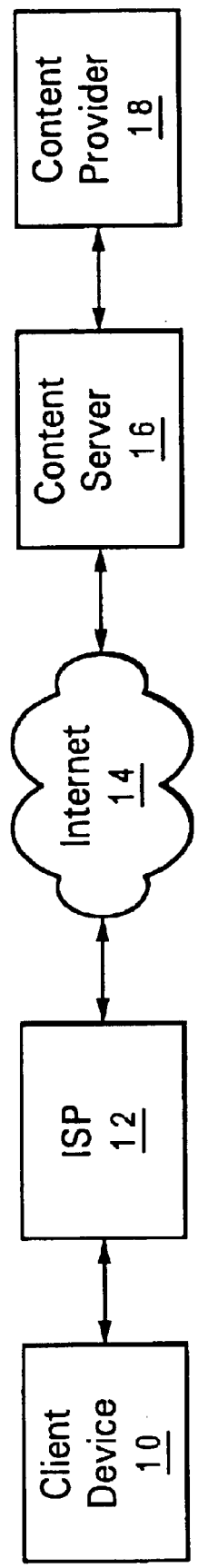
FIG. 1 depicts a simplified block diagram of prior art Internet connections.

As shown in FIG. 2, in the preferred embodiment proxy machine 11 performs several functions. Proxy machine 11 connects client device 10, as described above, to Web content servers 30, which may be an Internet service (ISP), Internet Content Provider (ICP), or other similar gate way devices. Proxy machine 11 acts as a proxy between client device 10 and Web content server 30, which provides content from content provider 18, shown in FIG. 1. Access to proxy machine 11 may be through a direct or network connection, and may be staged using different communication medium. For example, a telephone may first require transmission through PSTN 13 to a voice server 29. Requests entering proxy machine 11 are routed, for load balancing, through network dispatcher 26. After routing has been determined, the requests are passed to one or more designated transcoders in a transcoder farm 24. User identification information is passed in the request and authenticated by a security server 20 based on the stored user set of protocol. If the user is not known or invalid, proxy machine 11 will direct the client device's user agent (browser) to authenticate the user by prompting it for a user I.D. and password. The authentication information is then be passed to proxy machine 11.

Once a user has been validated, the designated transcoder will query user data base 22 for profile information. In the preferred embodiment, this profile information is delivered through an extensible Markup Language (XML) transcoding directive, which provides directives to the transcoder showing the user's preferred transcoding order, format, etc. The designated transcoder will then retrieve the document from Web content server 30, apply the transformation and send it back to client device 10. The transcoding software in proxy machine 11 is designed to handle dynamic transcoding. To do this, each transcoder stores the document retrieved in browser form for manipulation by each of the desired transformations. As a browser, proxy machine 11 works to separate content, data, and executable script for manipulation by the transcoder in transcoder farm 24. This manipulation is designed to improve the accessibility and usability by the disabled or senior user accessing proxy machine 11. The transcoder functions, which are based on the internal browser engine of client device 10, may provide low vision/cognitive transforms, blind transforms, or other transforms.

Other transcoder functions include support for secure connections. Proxy machine 11 may establish a secure socket connection, preferably in the method and system described in U.S. patent application Ser. No. 09/962,000, to Web content servers 30, and this secure connection may be accessed from client device 10 through a secure or non-secure connection, depending on user preference and set up of proxy machine 11. In addition, transcoder functions may provide access to intermediary web applications 28, which may be mail, settings, bookmarks, history lists, or other features typically associated with a browser. Therefore, in this application, proxy machine 11 acts as a proxy browser providing functions in intermediary web application 28.

User data base 22 functions primarily to provide transcoding and accessibility directives based on user profiles specific for a client. The user profiles show client preferences for accessibility display of content. The directives are typically conveyed to the transcoder in transcoder farm 24 through an XML-based transcode directive. These same user profiles may be passed through intermediary web applications 28, which are then transcoded in transcoder farm 24 according to the user profile preferences. The directives are preferably specific for and based on the specific user's type of client device 10 and browser, and/or the web page's format, including Multiple Internet Mail Extensions (MIME) type.

Referring again now to FIG. 2, as a request is sent from client device 10 to proxy machine 11, the request is sent to Web content server 30 after the client has been authenticated as an authorized user of proxy machine 11. The response is then returned from Web content server 30, typically in HTML format, where it is transcoded in transcoder farm 24 according to a user profile found in user data base 22. The transcoding then applies the appropriate transform, to include those described above for low vision/cognitive disabilities, blindness, and others.

While transforms have been described above in examples transforming content from Web content servers 30 back to client device 10, transforms may also be accomplished going from client device 10 to Web content server 30. For example, when the user of client device 10 types back a response to a query from Web content server 30, that user may have a physical disability such as palsy, in which specific typewriter keys are inadvertently repeatedly struck. The user profile in user data base 22, having this information, can direct a transcoder in transcoder farm 24 to automatically correct such double strikes, typically through a combination of timing criteria and logical autocorrection algorithms.

By having a user profile stored in proxy machine 11 that is unique for a user, the user is then able to utilize a variety of client devices 10, by all having access to the user's profile in user data base 22. For example, if the user needs to have image magnified, background removed, and a different display color on a desktop computer, the same user preferences would be automatically applied to any computer used by that user when going through proxy machine 11. Thus the user's own laptop, a borrowed desktop, or a public computer terminal would all display content from any Web site in the same format as defined by that user.

Figure 3:
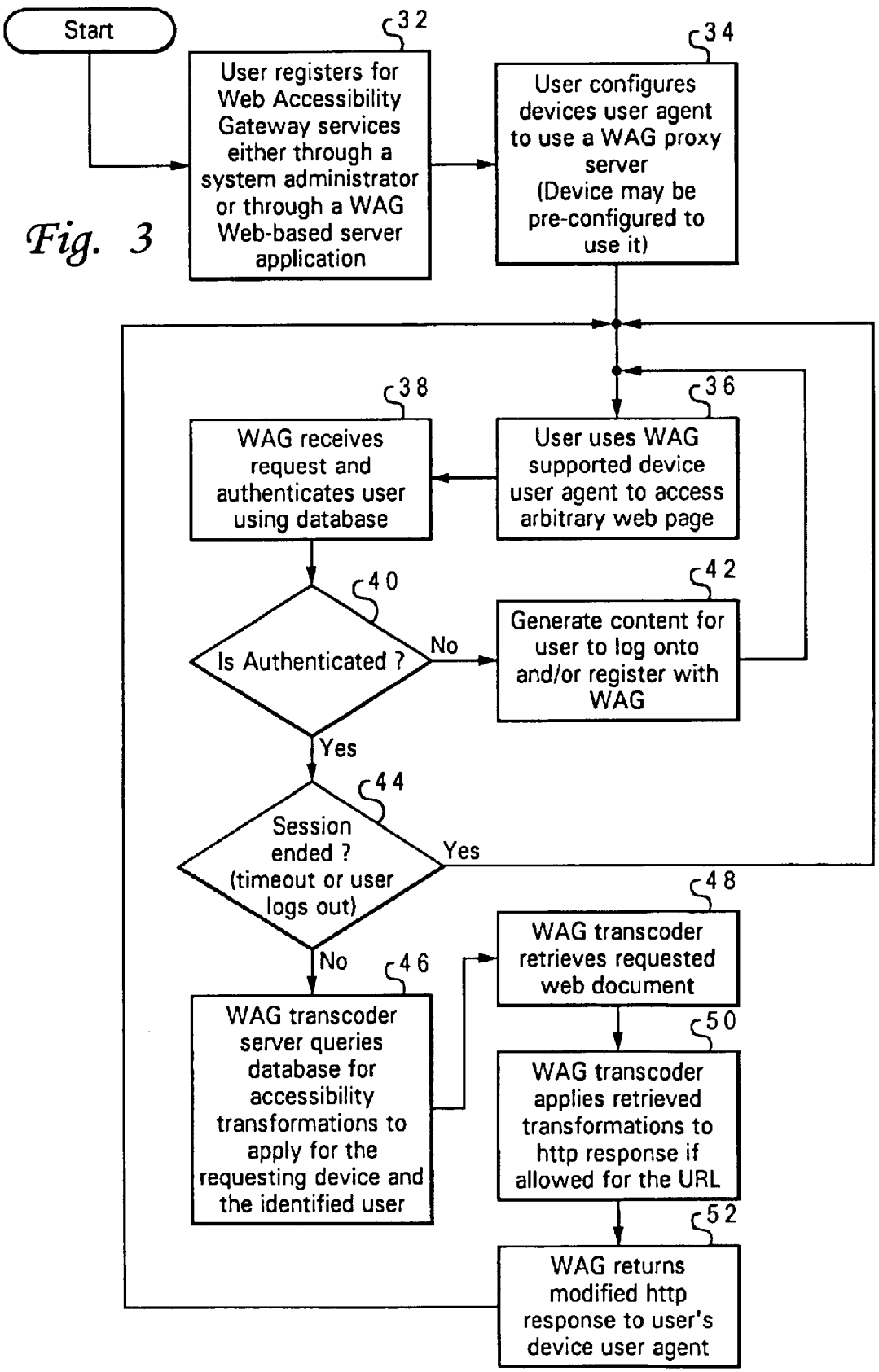
FIG. 3 depicts a high-level flow chart of the preferred embodiment of the invention.

Reference is now made to FIG. 3, a high-level flowchart describing a preferred embodiment of the present invention for accessing and transcoding web pages. As depicted in block 32, the user of client device 10 registers for the Web Accessibility Gateway (WAG) services offered through proxy machine 11 either through a system administrator or through a WAG Web-based server application, typically a web page generator with active fields for receiving user enrollment information. Client device 10 is configured, either by an automatic setting service or manually by the user, to use proxy machine 11 as a WAG proxy server, as depicted in block 34. Using proxy machine 11 as a WAG proxy server, the user accesses any web page on the Internet, as illustrated in block 36. WAG proxy machine 11 receives the request for a web page and authenticates the user who is directing proxy machine 11 to apply accessibility transformations in transcoder farm 24 according to directives from user database 22, as illustrated in block 38. A query, as described in block 40, is made as to whether the user is authenticated. If not, a directive, as illustrated in block 42, is sent back to client device 10, typically in the form of a web page, requesting content for the user to log onto and/or register with the WAG services offered through proxy machine 11.

When the user is authenticated, a query is made as to whether the session is ended, either because of the expiration of a pre-set amount of time or at the user's direction, as shown in block 44. If the session is still in operation, a server for the WAG transcoder farm 24 queries user database 22 for accessibility transforms to be applied for the requested device and the identified user, as shown in block 46. These transforms may include low vision/cognitive transforms designed to allow a person with limited vision to view the content. Transmissive corrections may be applied to modify the style sheet of the Web site, such as changing color or background. Text may be magnified. Increased white space may be applied between letters to aid in those with cognitive disorders. The image may be magnified, sharpened, increased in contrast, and/or have animation removed. The page may be simplified, removing background art work, header displays, etc.

As depicted in blocks 48, 50, and 52, the WAG transcoders in transcoder farm 24 retrieve the requested web document, apply the retrieved transformations to the web page, and return the transcoded web page to the user agent of user device 10. The requested web document can come from any server on the network, including those with a different domain address than the address associated with proxy machine 11. Note that in block 50 transformations are performed only "if allowed". A transcoding may be prohibited by a web page due to injected codes in the web page for a variety of technical or nontechnical reasons by the webmaster, such as prohibiting modification of financial data.

As can be seen in the above description, the present invention allows accessibility to any web page, affording access to a disabled user for any arbitrary web page. Besides removing accessibility barriers to the Internet for the disabled user, the present invention presents web content providers a means and method of providing accessible content to any Internet user without having to provide the transform transcoding through content server 16.

It is understood and appreciated that instructions from a content provider directing that the content provided is not to be transcoded or similarly manipulated should be honored. For example, a "no-transform directive" in an HTTP header or similar instructions should be followed, and the content not transcoded or similarly manipulated according to the instructions of the content provider. A description that is illustrative of such an instruction is found in Section 14.9.5 of the 1999 Network Working Group's HyperText Transfer Protocol HTTP/1.1.

While the invention has been particularly shown and described with reference to a preferred embodiment, it will be understood by those skilled in the art that various changes in form and detail may be made therein without departing from the spirit and scope of the invention.

What is claimed:

1. A method for providing accessibility to any web site on a computer network, said method comprising:

connecting a proxy machine between a client device and a web content server;

in response to a web page content request from the client device to the proxy machine, sending from the proxy machine the web page content request to a web content provider having a different domain address from the proxy machine;

receiving at the proxy machine a web site content response from the web content server, the proxy machine having access to a plurality of transcoders and a directive script database;

transcoding for accessibility the web site content into a transcoded content according to a set of accessibility directives established for a specific user, wherein the transcoding is performed according to at least one directive script from the directive script database, and wherein the at least one directive script selectively defines at least one transcoding property of at least one transcoder within the plurality of transcoders;

directing, according to the at least one directive script, which of said at least one transcoders are to be run;

directing, according to the at least one directive script, what order the at least one transcoders are to be run; and sending the transcoded content to the client device.

2. The method of claim 1, wherein said proxy machine and said web content provider are connected by a secure connection.

3. The method of claim 1, further comprising:
registering in a database in the proxy machine the specific user for a service providing the transcoding; and
allowing only a registered specific user to access the service.

4. The method of claim 1, wherein the set of accessibility directives are based on the client device type.

5. The method of claim 1, wherein the set of accessibility directives are based on the client device's browser.

6. The method of claim 1, wherein the set of accessibility directives are based on the MIME-type of the web site content.

7. A system for providing accessibility to any web site on a computer network, said system comprising:
means for connecting a proxy machine between a client device and a web content server;
means for, in response to a web page content request from the client device to the proxy machine, sending from the proxy machine the web page content request to a web content provider having a different domain address from the proxy machine;
means for receiving at the proxy machine a web site content response from the web content server, the proxy machine having access to a plurality of transcoders and a directive script database;
means for transcoding for accessibility the web site content into a transcoded content according to a set of accessibility directives established for a specific user, wherein the transcoding is performed according to at least one directive script from the directive script database, and wherein the at least one directive script selectively defines at least one transcoding property of at least one transcoder within the plurality of transcoders;
means for directing, according to the at least one directive script, which of said at least one transcoders are to be run;
means for directing, according to the at least one directive script, what order the at least one transcoders are to be run; and
means for sending the transcoded content to the client device.

8. The system of claim 7, wherein said proxy machine and said web content provider are connected by a secure connection.

9. The system of claim 7, further comprising:
means for registering in a database in the proxy machine the specific user for a service providing the transcoding; and
means for allowing only a registered specific user to access the service.

10. The system of claim 7, wherein the set of accessibility directives are based on the client device type.

11. The system of claim 7, wherein the set of accessibility directives are based on the client device's browser.

12. The system of claim 7, wherein the set of accessibility directives are based on the MIME-type of the web site content.

13. A computer program product for providing accessibility to any web site on a computer network, said computer program product comprising:
computer program code for connecting a proxy machine between a client device and a web content server;
computer program code for, in response to a web page content request from the client device to the proxy machine, sending from the proxy machine the web page content request to a web content provider having a different domain address from the proxy machine;
computer program code for receiving at the proxy machine a web site content response from the web content server, the proxy machine having access to a plurality of transcoders and a directive script database;
computer program code for transcoding for accessibility the web site content into a transcoded content according to a set of accessibility directives established for a specific user, wherein the transcoding is performed according to at least one directive script from the directive script database, and wherein the at least one directive script selectively defines at least one transcoding property of at least one transcoder within the plurality of transcoders;
computer program code for directing, according to the at least one directive script, which of said at least one transcoders are to be run;
computer program code for directing, according to the at least one directive script, what order the at least one transcoders are to be run; and
computer program code for sending the transcoded content to the client device.

14. The computer program product of claim 13, wherein said proxy machine and said web content provider are connected by a secure connection.

15. The computer program product of claim 13, further comprising:
computer program code for registering in a database in the proxy machine the specific user for a service providing the transcoding; and
computer program code for allowing only a registered specific user to access the service.

16. The computer program product of claim 13, wherein the set of accessibility directives are based on the client device type.

17. The computer program product of claim 13, wherein the set of accessibility directives are based on the client device's browser.

18. The computer program product of claim 13, wherein the set of accessibility directives are based on the MIME-type of the web site content.

19. A method of doing business to provide accessibility to any web site on a computer network, said method comprising:
providing a service for connecting a proxy machine between a client device and a web content server;
providing a service for, in response to a web page content request from the client device to the proxy machine, sending from the proxy machine the web page content request to a web content provider having a different domain address from the proxy machine;
providing a service for receiving at the proxy machine a web site content response from the web content server, the proxy machine having access to a plurality of transcoders and a directive script database;
providing a service for transcoding for accessibility the web site content into a transcoded content according to a set of accessibility directives established for a specific user, wherein the transcoding is performed according to at least one directive script from the directive script database, and wherein the at least one directive script selectively defines at least one transcoding property of at least one transcoder within the plurality of transcoders;

providing a service for directing, according to the at least one directive script, which of said at least one transcoders are to be run;

providing a service for directing, according to the at least one directive script, what order the at least one transcoders are to be run; and providing a service for sending the transcoded content to the client device.

20. The business method of claim 19, wherein said proxy machine and said web content provider are connected by a secure connection.

21. The business method of claim 19, further comprising:
providing a service for registering in a database in the proxy machine the specific user of the accessibility transcoding service; and
providing a service for allowing only a registered specific user to access the accessibility transcoding service.

22. The business method of claim 19, wherein the set of accessibility directives are based on the client device type.

23. The business method of claim 19, wherein the set of accessibility directives are based on the client device's browser.

24. The business method of claim 19, wherein the set of accessibility directives are based on the MIME-type of the web site content.

* * * * *